United States Patent [19]

Cooper et al.

[11] Patent Number: 4,586,616
[45] Date of Patent: May 6, 1986

[54] UNIVERSAL MAGNETIC UTENSIL MOUNTING BAR

[75] Inventors: Rosemary J. Cooper, East Longmeadow; Walter M. Misterka, Wilbraham; Real L. Mercier, West Springfield, all of Mass.

[73] Assignee: R. E. Phelon Company Incorporated, East Longmeadow, Mass.

[21] Appl. No.: 559,974

[22] Filed: Dec. 9, 1983

[51] Int. Cl.⁴ .................................................. A47F 5/08
[52] U.S. Cl. .................................... 211/87; 211/DIG. 1; 248/206.5; 248/309.4; 335/285
[58] Field of Search ................. 211/DIG. 1, 60.1, 87, 211/105.1, 70.6, 105.2; 335/285; 242/55.2; 248/206.5, 309.4, 37.3, 37.6

[56] References Cited

U.S. PATENT DOCUMENTS

| | | | |
|---|---|---|---|
| 2,580,099 | 12/1951 | Jaeger | 211/87 X |
| 2,978,215 | 4/1961 | Shanok et al. | 248/206.5 X |
| 2,988,315 | 6/1961 | Saxe | 211/87 X |
| 3,229,820 | 1/1966 | Hentzi et al. | 248/309.4 X |
| 3,282,519 | 11/1966 | Rheinstrom | 242/55.2 |
| 3,408,771 | 11/1968 | Garrett et al. | 248/206.5 X |
| 3,504,878 | 4/1970 | Dressler | 211/105.1 X |
| 3,827,021 | 7/1974 | Phelon | 248/309.4 X |

Primary Examiner—Robert W. Gibson, Jr.
Attorney, Agent, or Firm—Chapin, Neal & Dempsey

[57] ABSTRACT

A universal magnetic utensil mounting bar has an integral modular frame of generally elongated, rectangular configuration. The frame includes on one side thereof, a central channel shaped recess which extends longitudinally from end-to-end thereof. The opposite side of said module includes a pair of parallel, longitudinally extending, vertically spaced recesses disposed outwardly of the central recess. A magnetic rod and pole pieces are disposed in each of the parallel recesses. The central recess is adapted to receive selectively therein another elongated magnetic rod and pole pieces, a mounting bar portion of a towel rack, the bar portion of utensil support hooks and the bar portion of a dispensing spindle for a roll of paper towels.

7 Claims, 8 Drawing Figures

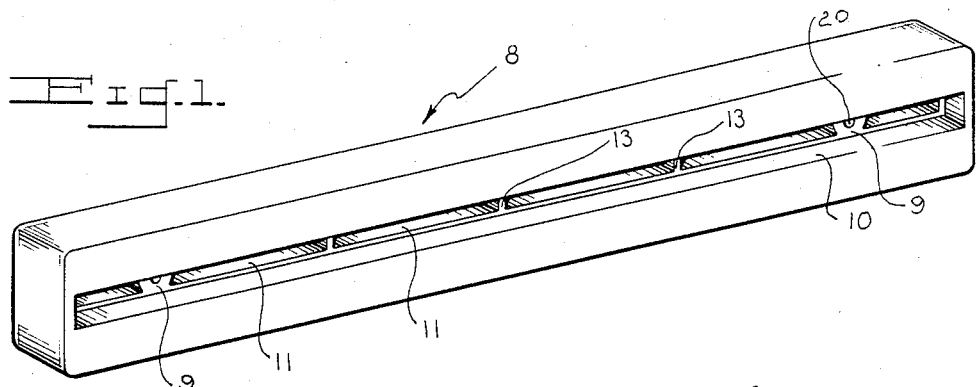
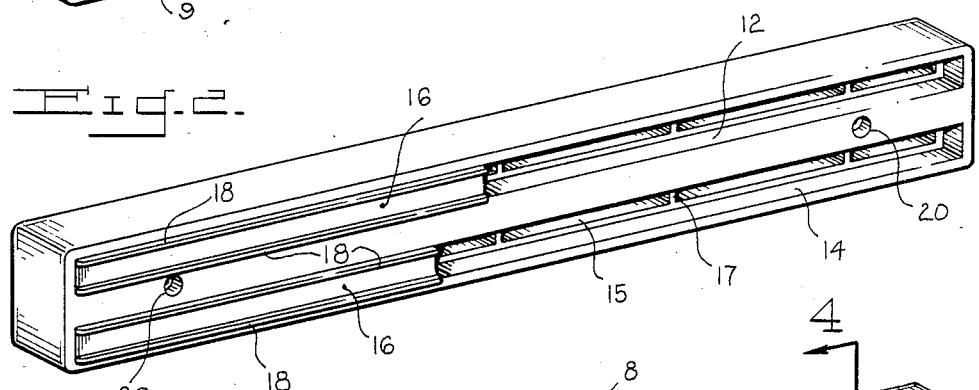
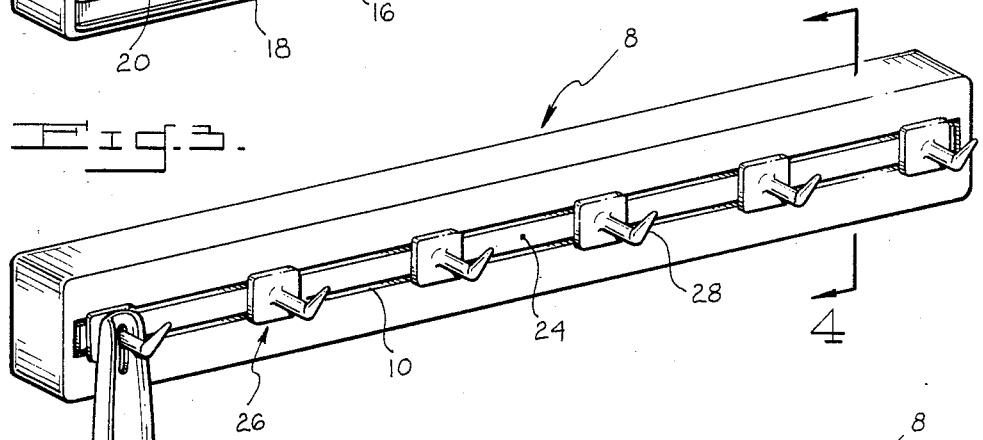
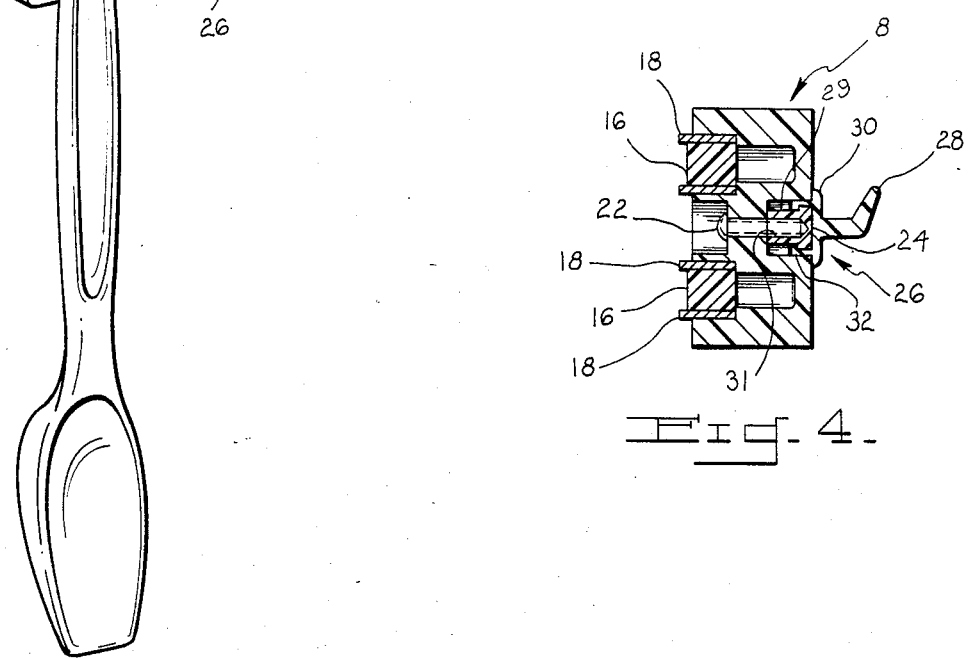

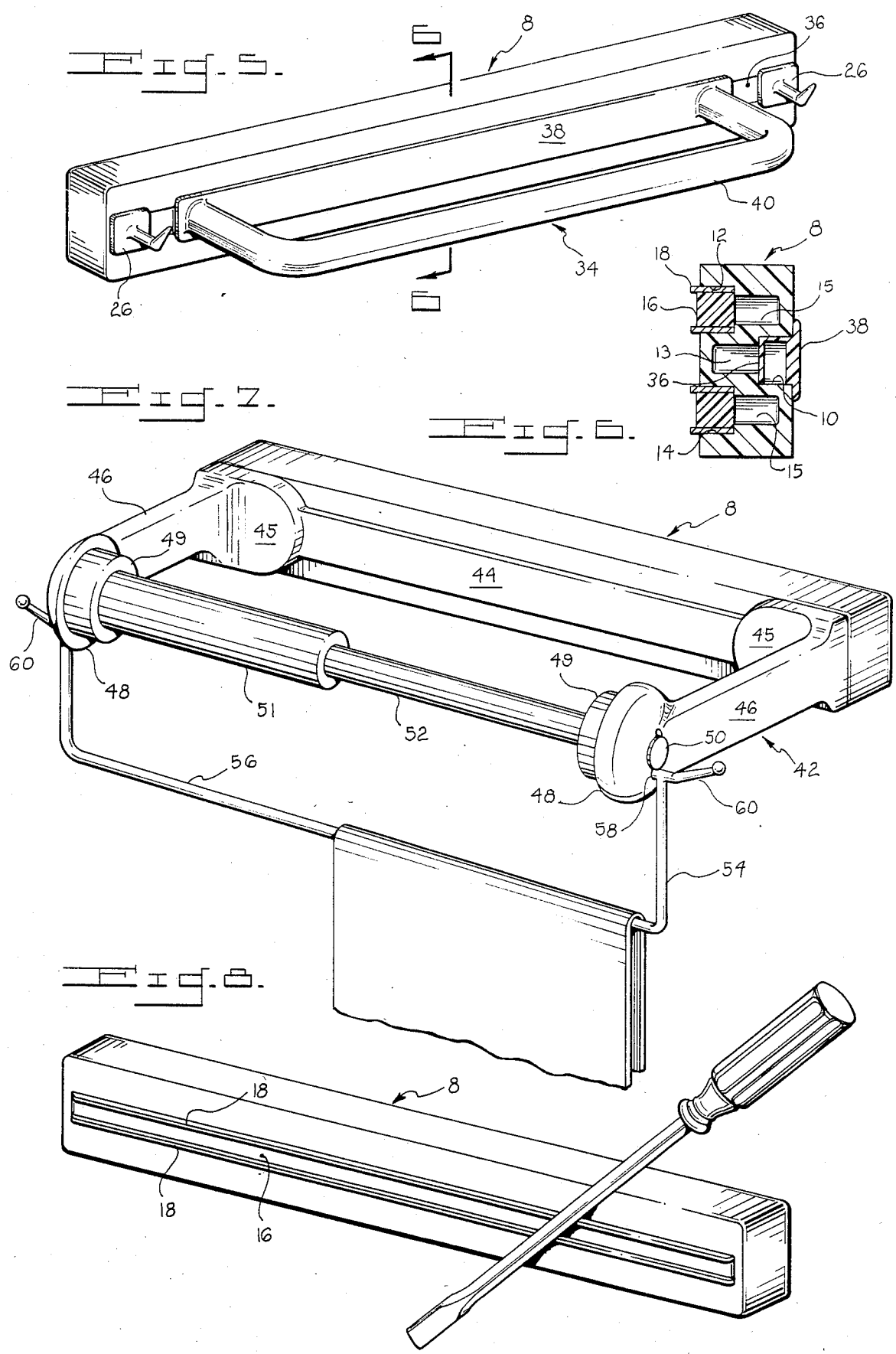

UNIVERSAL MAGNETIC UTENSIL MOUNTING BAR

BACKGROUND OF THE INVENTION

This invention relates to magnetic fixtures for holding a variety of tools and household utensils. More particularly, it relates to a universal magnetic fixture of integral molded construction which is adapted to receive permanent magnet rods within channels on one side of the fixture and any one of a plurality of other holding fixtures in a channel formed in the opposite side of the fixture.

Magnetic gripping fixtures such as disclosed in Phelon U.S. Pat. No. 3,827,021, dated July 30, 1974 have, for many years, been in common household use for magnetically holding ferrous metal kitchen utensils and in workshops for holding tools. Such fixtures have permanent magnet rods disposed in channels along one surface of a bar and the fixtures are attached to a wall by means of screws fitted through holes provided in the bar. A patent to Hentzi U.S. Pat. No. 3,299,820 is of generally the same type of magnetic holder as disclosed in the Phelon Patent, except that it employs a molded casing. The patent to Jaeger U.S. Pat. No. 2,580,099 and to Dunkelberger U.S. Pat. No. 2,966,922 disclose "double-sided" magnetic holding devices. It will be noted that both devices disclosed in these patents are quite complicated in construction and in addition, the Jaeger device is rather cumbersome and of limited utility. The '922 Patent, moreover, requires a plastic sheath or cover into which a plurality of separate magnet blocks, pole strips, and spacer strips are arranged to provide a "double-sided" magnetic holding fixture. It will be readily recognized that the assembly of a plurality of discrete magnet blocks and six (6) additional strips within a sheath or cover member is a relatively awkward and complex procedure.

The principal object of this invention is to provide a magnetic mounting fixture of simple and economical construction which is readily adaptable to a wide variety of different applications without structural modification.

Another object of this invention is to provide an integral, universal frame member adapted to provide a fixture which is magnetically mountable on one side and serves for holding utensils on its other side by any one of a plurality of different holders which interchangeably fit within the frame member.

The above and other objects and advantages of this invention will be more readily apparent from the following description read in conjunction with the accompanying drawings, in which:

FIG. 1 is a perspective view showing one side of the frame member of a mounting fixture of the type embodying this invention;

FIG. 2 is a perspective view of the opposite side of the frame member of FIG. 1, and with parts cut away to illustrate its construction;

FIG. 3 is a perspective view similar to FIG. 1, but which includes additional components;

FIG. 4 is a section taken along line 4—4 of FIG. 3;

FIG. 5 is a view similar to FIG. 3 showing another application of the device embodying this invention;

FIG. 6 is a section taken along line 6—6 of FIG. 5;

FIG. 7 is a perspective view of the mounting fixture adapted for another application, and FIG. 8 is a perspective view similar to FIG. 1 which illustrates one side of a double-sided magnetic holding device.

Referring in detail to the drawing in FIG. 1, a modular frame or housing 8 is shown. The frame is preferably of integral molded construction and is of elongated configuration and generally rectangular in cross-section. One side of this frame is shown in FIG. 1 and the opposite side, thereof, is shown in FIG. 2. For ease of explanation, the side depicted in FIG. 1 will be considered of the front side of the frame while the back side is shown in FIG. 2. The front side of the frame includes one longitudinally extending slot, recess or channel 10. The channel 10 is approximately vertically centered in the front wall and it has a depth which extends a substantial distance within the frame and at its bottom or inner end there are a plurality of vertically extending webs 13 which define therebetween a plurality of longitudinally spaced cavities 11. A pair of apertured cylindrical ribs or bosses 9 are located a short distance inwardly from the outer end walls of the frame and provide the means by which various components may be affixed within the frame, as will hereinafter be described. The back side of the frame includes a pair of parallel, vertically spaced channels 12 and 14 (FIG. 2). The channels 10, 12 and 14 are inwardly tapered to provide a draft for removal of the part from the mold cavity.

As best illustrated in FIG. 6, the central channel 10 opens outwardly in one direction and the vertically spaced channels 12 and 14 open outwardly in the opposite direction. The channel 10 and its inner cavity portions 13 are transversely coextensive with the channels 12 and 14 and their inner cavity portions 15. With this construction, a minimum of molding material is required while the webs 13 and 17 impart strength and rigidity to the frame. The channels 10, 12 and 14 are preferably identical in length and cross-sectional configuration. The frame is thereby adapted for receiving in each channel, the mounting beams or rods of corresponding size and shape. The frame is thus readily adaptable to a variety of utilities and is extremely versatile. In FIGS. 3, 5, 7 and 8, for example, four different holding fixtures are illustrated and the same modular frame may be employed in each of these fixtures.

Permanent magnets in the form of rods or bars 16, preferably a vinyl-type magnet, each sandwiched between a pair of flat steel strips 18 are fitted into each of the channels 12 and 14. This construction is best illustrated in FIGS. 2 and 4. The strips 18 serve as pole pieces for the magnet which may have its North pole along the upper edge thereof and the South pole along the lower edge thereof or vice versa. The magets and pole pieces extend over the full length of the channels although they are shown broken away in FIG. 2 for purposes of illustrating the inner structural features of the frame. Holes 20 in the ribs 9 extend through the back wall of the frame 8 and, as shown in FIG. 1, open into the bottom of the channel 10.

The two magnet rods 16 and the pole pieces 18 fitted into the recesses in the back of frame 8 may be permanently affixed therein by use of a suitable bonding agent or cement, such as an epoxy adhesive compound. These magnets provide sufficient magnetic flux for securely holding the back of the frame against any ferrous surface, such as a refrigerator panel, metal cabinet, stove or the like.

The front side channel 10 of the frame 8 may be selectively fitted with any one of a number of implement holding devices. In FIG. 3 for example, a rack having a plurality of spaced hooks 26 is shown. The rack comprises a modular frame 8 with two magetic strips mounted in the back channels thereof. An elongated beam 24 of generally T-shaped cross-section is fitted into front channel 10 and it includes an outer flange portion and a pair of laterally spaced stem portions 29. A pair of internally threaded bosses 31 are disposed between the stem portions and these are located to register with the holes 20 provided in the frame 8. Slidably carried on the beam 24 are a plurality of individual hooks 26, each of which includes a base or flange portion 30, an outwardly and upwardly extending hook portion 28 and L-shaped leg portions 32 adapted to interfit around the outer edge portion of the beam 24. To assemble the hook rack onto the frame 8, it is simply a matter of sliding the leg portions 32 of the hooks onto the ends of the flange portion of the beam and then fitting the stem portions 29 of the beam into the channel 10 of the frame 8. A pair of screws or bolts 22 are then screwed into the threaded bosses 31 of the beam 24. The hook rack, as shown in FIG. 3, provides a magnetic bar which may be magnetically fastened onto any ferrous metal surface for hanging a variety of kitchen utensils or other implements, such as illustrated in FIG. 3.

In FIG. 5, a towel support bar shown generally at 34 has been substituted in the frame for the hook rack of FIG. 3. The towel support bar 34 includes an inner beam portion 36, a generally planar flange 38 carried on the outer surface of the beam 36 and a towel support bar of generally U-shaped configuration. The beam portion of the towel rack is generally rectangular and preferably tubular cross-section. A pair of hooks 26 of the same type described above may optionally be fitted onto the outer end portions of the beam 36. The beam portion 36 may either extend in a continuous length from end-to-end within the frame recess 10 or consist of a plurality of longitudinally spaced beam portions which would result in economy of the molding compound used to form the insert. The beam 36 may be either fastened in-place using screws 22 in the same manner as for the hook rack 24 or it may be cemented in-place within the recess 10 using a suitable bonding material.

In FIG. 7, is shown a towel dispensing rack 42 for a roll of paper towels (not shown). The rack includes an inner beam portion which interfits within the channel 10 of the frame 8 and an enlarged flange which is carried on the outer surface of the beam. A pair of support arms 46 extend from an enlarged base or pedestal 45 carried on each of the outer ends of the flange 44. At the outer end of each arm is a hub 48 having a correspondingly shaped recess therein and a smaller diameter hole is provided through the center of the hubs 48 to receive and rotatably support the outer ends of the shaft or spindle 50 of a towel roll support member. The spindle also includes cylindrical outer end flanges 49 which rotatably interfit within the opposed, correspondingly shaped recesses in the hubs 48. The spindle also includes a cylindrical sleeve portion 51 into which a coil spring (not shown) is fitted and a cylindrical rod 52 which telescopically fits within the open end of sleeve 51. To insert the spool into the supporting hubs 48, the two end portions of the shaft are first separated and then interfitted together within the tubular roll of paper towels and the two ends of the spindle are then pressed together to compress the coil-spring within the cylinder 51. The outer ends of the shaft 50 are then aligned with the holes in the hubs 48 and the spindle released. The coil-spring thereupon urges the spindle to its extended condition firmly supported by the arms 45 of the fixture.

As an optional feature, a hanger bar 54 for a dishcloth or dishtowel may be pivotably mounted on the hub portions 48 of the towel support arms 45. The hanger bar is generally U-shaped with depending leg portions and a cross-bar portion 56. It also includes inwardly extending stub portions 58 and outwardly extending handles or arms 60. Each of the leg portions of the bar is of a length greater than the radius of commercially available paper towel rolls so that the bar can be used in combination with such a towel roll. The hanger is preferably formed of a resiliently flexible material, such as a spring metal or a suitable synthetic plastic. The stubs releasably interfit within small cylindrical slots or recesses in the outer surfaces of the hubs 48. The hanger may be removed by simply grasping the handle 60 and flexing the hanger bar outwardly to release the stubs 58 from the accommodating recesses.

In FIG. 8 is shown another application of this invention. In this application, a double-sided magnetic fixture is provided. The back of the fixture includes vertically spaced magnet members 16 as described in connection with FIG. 2. The front of the fixture includes another identical magnetic member disposed within the center channel 10 (FIG. 1). The magnet members include magnetic bars 16 and two metallic pole pieces 18. The opposite sides of the magnet bar are of opposite plurality and one pole piece is thus a North pole and the other a South pole. In this application, the back of the fixture may be magnetically attached to any ferrous supporting surface, such as a refrigerator panel or the like. Any ferrous implements such as kitchen utensils or tools may be magnetically held by the outer magnetic member, as illustrated in FIG. 8.

With this invention, an integral synthetic plastic frame may be injection-molded for use with any one of a variety of inserts to provide a complete product line of magnetic holding fixtures. This invention enable the manufacturer to achieve substantial economies of molding materials and capital expenditures for injection-molding equipment which require only one set of cavities for the frame 8. Moreover, the frame is universally adaptable for use in combination with a plurality of different insert fixtures.

Having thus described this invention, what is claimed is:

1. Wall mountable magnetic fixture for holding tools, utensils and the like comprising an integral molded frame having a pair of vertically spaced, parallel elongated channels opening into one side of the frame, and a third channel opening into the opposite side thereof, a magnetic rod disposed in each of the spaced channels for magnetically attaching the one side of the frame onto a ferrous wall, said third channel being disposed intermediate said spaced channels and being adapted to receive therein a holding fixture having an inner beam portion which corresponds to the cross-section of said magnetic rod whereby the beam portion or another magnetic rod may be selectively fitted into said third channel.

2. Wall mountable magnetic fixture as set forth in claim 1, which said pair of channels and said third channel are of generally the same cross-section and communicate at their inner ends with cavities which open toward opposite sides of the frame, whereby the channels and cavities of the pair of channels and third channel are transversely coextensive within said frame.

3. Wall mountable magnetic fixture as set forth in claim 2, in which the third channel has disposed therein an elongated magnetic rod sandwiched between a pair of metallic pole strips on the opposite edges of said rod whereby said fixture includes magnetic rods carried on both back and front surfaces of said fixture for magnetically mounting the fixture on one side on a ferrous surface and for magnetically supporting on the opposite side thereof, ferrous tools, utensils and the like.

4. Wall mountable magnetic fixture as set forth in claim 2, and including a towel support rack having an inner beam portion disposed within said third channel.

5. Wall mountable magnetic fixture as set forth in claim 2, and including a hook support member having an inner beam portion carrying a plurality of utensil support hooks thereon, said beam portion being disposed within said third channel.

6. Wall mountable magnetic fixture as set forth in claim 2, and including a support member for a roll of paper towels and including an inner beam portion, a pair of laterally spaced arms and a spindle for rotatably supporting the towel roll, said beam portion being disposed within said third channel.

7. Wall mountable magnetic fixture as set forth in claim 4, in which said towel support rack is of generally U-shaped configuration of a length shorter than said beam portion and at least one utensil support hook fitted on said beam portion outwardly of each end of said towel rack.

* * * * *